Patented Jan. 14, 1930

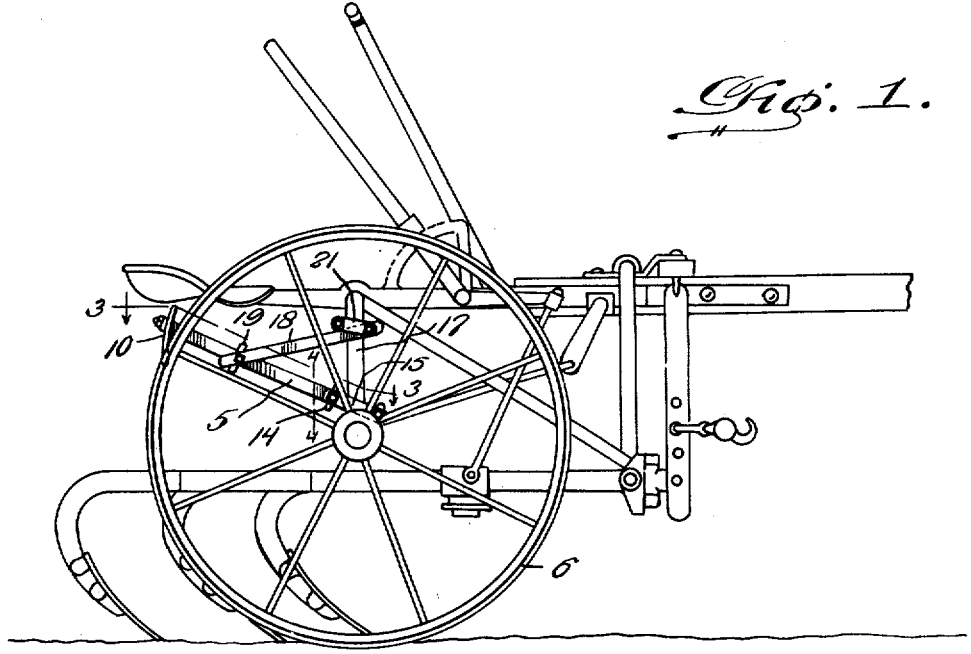
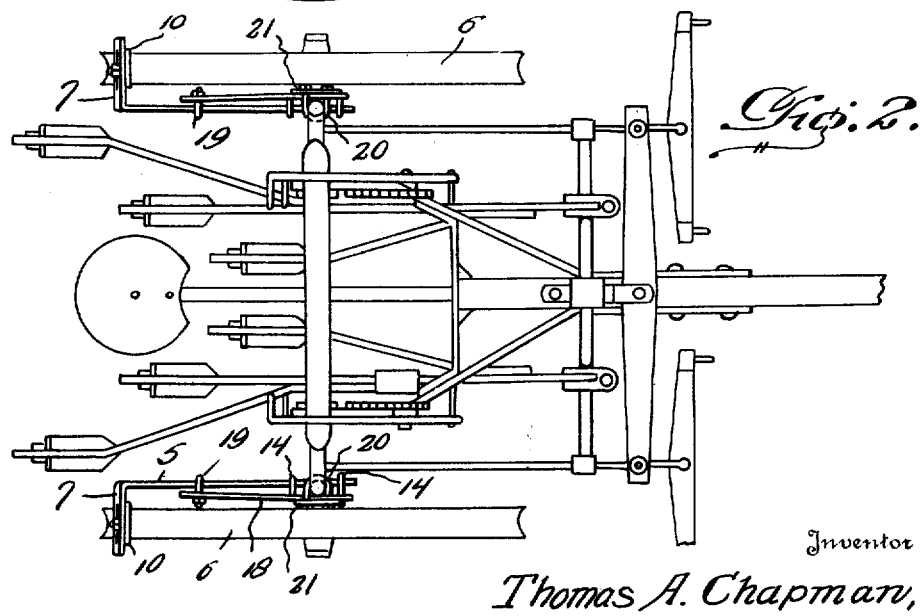

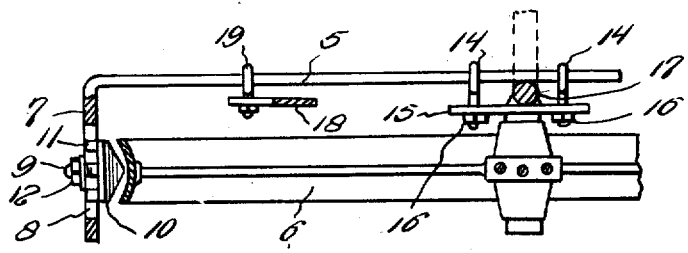
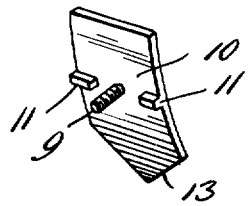
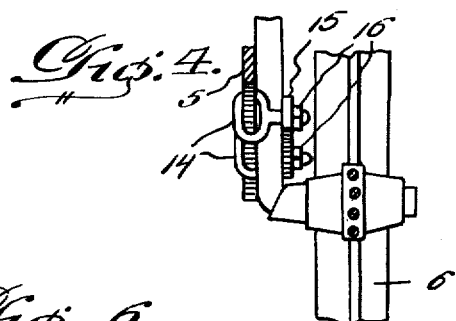
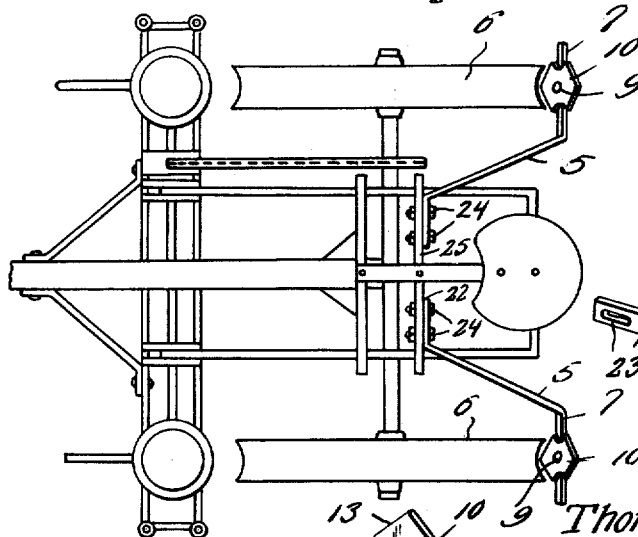
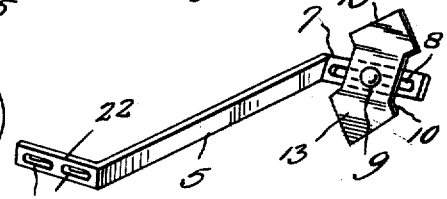
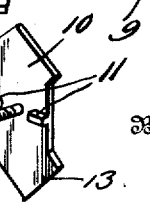

1,743,530

UNITED STATES PATENT OFFICE

THOMAS A. CHAPMAN, OF COOLEDGE, TEXAS

WHEEL SCRAPER

Application filed May 28, 1928. Serial No. 281,146.

This invention relates to wheel scrapers, and has particular reference to an improved device adapted for attachment to land vehicles, such as cultivators and planters, for the purpose of scraping the mud from the traction wheels thereof.

The primary object of the invention is to provide a wheel scraper of the above kind which is extremely simple in construction, which may be readily applied to the vehicle, and which provides for adjustment so as to adapt the device for efficient use on vehicles of different sizes.

The invention consists in the novel form, combination and arrangement of parts hereinafter more fully described, shown in the accompanying drawings and claimed.

In the drawings:—

Figure 1 is a side elevation of a cultivator equipped with wheel scrapers embodying the present invention.

Figure 2 is a top plan view thereof.

Figure 3 is an enlarged fragmentary section on line 3—3 of Figure 1.

Figure 4 is an enlarged fragmentary section on line 4—4 of Figure 1.

Figure 5 is an enlarged rear perspective view of the scraper blade of each wheel scraper shown in Figure 1.

Figure 6 is a top plan view of a planter having wheel scrapers of modified form applied thereto.

Figure 7 is a perspective view of one of the wheel scrapers of Figure 6, detached; and Figure 8 is a view similar to Figure 5, of the scraper blade of the wheel scraper shown in Figure 7.

Referring more in detail to the drawings, each wheel scraper embodies a blade supporting arm in the form of a metal bar 5, adapted to be attached at its forward end to the vehicle frame adjacent and at the inner side of one of the traction wheels 6 of the vehicle, and having an outwardly and laterally directed rear end portion 7 formed with a longitudinal elongated slot 8 which slidably receives an attaching bolt 9 of a scraper blade 10 and a pair of transversely alined lugs 11 provided on the rear face of said blade at opposite sides of the bolt 9. A nut 12 is threaded on the bolt 9 to firmly secure the scraper blade in adjusted position, and the lugs 11 prevent turning of the blade about the axis of the bolt. By loosening the nut 12, the scraper blade may be adjusted laterally to properly position it with respect to the wheel rim or tread, and said blade is preferably tapered or pointed as at 13 to effectively penetrate the mud and effect its dislodgement.

In the form of the invention shown in Figures 1 to 5 inclusive, the means for attaching the forward end of the blade supporting arm to the vehicle frame consists of a clamp comprising a pair of spaced eye bolts 14 having elongated eyes slidably fitted on the supporting arm 5, and having their shanks passing through the ends of a clamping plate 15, nuts 16 being applied to said shanks to firmly clamp the device on the adjacent vertical side member 17 of the crank axle of the cultivator, or the like. In order to prevent the blade supporting arm 5 from shifting vertically from proper operative position, a brace arm 18 is attached at its rear end, as at 19, to the intermediate portion of said arm 5, and has its forward end attached to the vertical axle member 17 above the arm 5 by means of a clamp composed of a U-bolt 20 and a clamping plate 21, one leg of the said U-bolt being pivoted in the end of the brace arm 18, and both legs thereof passing through the clamping plate 21 and having nuts applied thereon. The attachment at 19 consists of an eye bolt having its eye slidably fitted on the arm 5 for adjustment longitudinally of the latter, and having its shank held in the end of the brace arm 18 by means of a nut applied thereon. It is thus apparent that the arm 5 may be slid through the eye bolts at 14 and 19 to adjust the scraper blade to the wheel, while the brace arm 18 and clamp 20, 21 may be angularly adjusted relative to each other and to the arm 5 to adapt the device to various forms and sizes of vehicles and to effect positioning of the arm 5 at the most desirable angle.

In the form of the invention shown in Figures 6 to 8 inclusive, the forward end portion 22 of the arm 5 is directed laterally and inwardly and provided with a pair of spaced longitudinal elongated slots 23 to receive a pair of bolts 24 by means of which the arm 5 is attached to the transverse member 25 of the planter frame for lateral adjustment relative to the latter. By flexing the intermediate portion of the arm 5 to an angular position relative to the longitudinal axis of the planter, the scraper blade may be adjusted to the wheel, and the blade may then be adjusted laterally for proper engagement with the wheel rim or tread by adjustment of the arm laterally relative to the frame, adjustment of the blade laterally relative to the arm, or both. The device may thus be employed on planters of various forms and sizes.

In the form of the invention shown in Figures 1 to 5 inclusive, the scraper blade is of single form with only one end tapered or pointed, while in the form of Figures 6 to 8 inclusive, the blade is double-ended or tapered or pointed at both ends so as to be reversible when it becomes worn.

In use, the pointed end of the blade is positioned in the concavity of the wheel rim so as to scrape the mud therefrom as the wheel turns upon forward travel of the vehicle, thereby preventing the mud and trash from accumulating in the wheel rim.

Minor changes may be made without departing from the spirit and scope of the invention as claimed.

What I claim as new is:

1. A wheel scraper attachment for land vehicles comprising a supporting arm having a laterally extending rear end portion, a scraper blade mounted on and laterally adjustable relative to said laterally extending rear end portion of the supporting arm, a clamp for attaching the forward end of the supporting arm to the frame of the vehicle, an upwardly inclined brace arm having its rear end attached to the intermediate portion of the supporting arm and provided with means for clamping its forward end in vertical adjustment to the vehicle frame above the forward end of the supporting arm, said supporting arm being longitudinally adjustable relative to said first named clamp and said brace arm for adjusting the scraper blade forwardly to the vehicle wheel, the means for attaching the brace arm to the supporting arm comprising an eye bolt having the supporting arm slidably fitted in the eye thereof and having the rear end of the brace arm pivotally secured thereon.

2. A wheel scraper attachment for land vehicles comprising a supporting arm having a laterally extending rear end portion, a scraper blade mounted on and laterally adjustable relative to said laterally extending rear end portion of the supporting arm, a clamp for attaching the forward end of the supporting arm to the frame of the vehicle, an upwardly inclined brace arm having its rear end attached to the intermediate portion of the supporting arm and provided with means for clamping its forward end in vertical adjustment to the vehicle frame above the forward end of the supporting arm, said supporting arm being longitudinally adjustable relative to said first named clamp and said brace arm for adjusting the scraper blade forwardly to the vehicle wheel, the means for attaching the brace arm to the supporting arm comprising an eye bolt having the supporting arm slidably fitted in the eye thereof and having the rear end of the brace arm pivotally secured thereon, said first named clamp comprising a pair of eye bolts having the supporting arm slidably fitted in the eyes thereof and provided with threaded shanks, and a clamping plate retained on said threaded shanks of the last named eye bolts.

In testimony whereof I affix my signature.

THOMAS A. CHAPMAN.